(12) United States Patent
EL-Jawahri et al.

(10) Patent No.: US 10,266,140 B2
(45) Date of Patent: Apr. 23, 2019

(54) RESTRAINT SYSTEM

(71) Applicant: Ford Global Technologies, LLC, Dearborn, MI (US)

(72) Inventors: Raed Essa EL-Jawahri, Northville, MI (US); James Chih Cheng, Troy, MI (US); Robert William McCoy, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 76 days.

(21) Appl. No.: 15/410,107

(22) Filed: Jan. 19, 2017

(65) Prior Publication Data
US 2018/0201215 A1 Jul. 19, 2018

(51) Int. Cl.
| | |
|---|---|
| *B60R 21/0136* | (2006.01) |
| *B60R 21/20* | (2011.01) |
| *B60R 21/16* | (2006.01) |
| *B60R 21/01* | (2006.01) |
| *B60R 21/02* | (2006.01) |
| *B60R 21/04* | (2006.01) |

(52) U.S. Cl.
CPC .......... *B60R 21/0136* (2013.01); *B60R 21/16* (2013.01); *B60R 21/20* (2013.01); *B60R 21/0286* (2013.01); *B60R 2021/01013* (2013.01); *B60R 2021/01211* (2013.01); *B60R 2021/0273* (2013.01); *B60R 2021/0407* (2013.01)

(58) Field of Classification Search
CPC ................ B60R 21/0136; B60R 21/20; B60R 2021/01013; B60R 2021/01211
See application file for complete search history.

(56) References Cited

U.S. PATENT DOCUMENTS

| | | | | |
|---|---|---|---|---|
| 4,955,658 A * | 9/1990 | Graves | .................... | B60N 3/063 296/75 |
| 5,839,756 A * | 11/1998 | Schenck | ................. | B60R 21/23 280/743.1 |
| 6,158,766 A | 12/2000 | Kowalski | | |
| 6,349,965 B1 * | 2/2002 | Heilig | ..................... | B60R 21/02 280/748 |
| 6,352,281 B1 * | 3/2002 | Buss | ....................... | B60R 21/16 280/730.1 |
| 6,371,511 B1 * | 4/2002 | Kitagawa | ................ | B60R 21/02 280/730.1 |
| 6,578,867 B2 | 6/2003 | Khoudari et al. | | |
| 6,817,625 B2 | 11/2004 | Hjerpe | | |

(Continued)

FOREIGN PATENT DOCUMENTS

| | | | | |
|---|---|---|---|---|
| DE | 19727598 A1 * | 1/1999 | ............. | B60N 3/066 |
| EP | 1488963 A1 | 12/2004 | | |

(Continued)

OTHER PUBLICATIONS

GB Search Report dated Jun. 27, 2018 re GB Appl. No. 1800826.8.

*Primary Examiner* — Darlene P Condra
(74) *Attorney, Agent, or Firm* — Frank A. MacKenzie; Bejin Bieneman PLC

(57) ABSTRACT

A restraint system for a vehicle includes a floor, a platform, and a deployable device. A hinge couples the platform to the floor. The deployable device is inflatable from an uninflated position to an inflated position. A material forming the platform is stiffer than a material forming the deployable device.

20 Claims, 4 Drawing Sheets

(56) References Cited

U.S. PATENT DOCUMENTS

| | | |
|---|---|---|
| 6,962,368 B2 | 11/2005 | Hjerpe |
| 7,431,330 B2 * | 10/2008 | Korechika ............ B60R 21/231 |
| | | 280/730.1 |
| 2002/0158449 A1 | 10/2002 | Hjerpe |
| 2008/0023977 A1 * | 1/2008 | Hoffman ................ B60N 3/046 |
| | | 296/24.3 |
| 2015/0274114 A1 | 10/2015 | Nagasawa et al. |
| 2016/0016527 A1 * | 1/2016 | Aselage ............. B60R 21/0132 |
| | | 280/728.3 |

FOREIGN PATENT DOCUMENTS

| | | | | |
|---|---|---|---|---|
| EP | 2256004 A1 | | 12/2010 | |
| FR | 2796022 A1 * | | 1/2001 | ............ B60N 3/042 |
| GB | 2418645 A | | 4/2006 | |
| JP | 2008260376 A | | 10/2008 | |

* cited by examiner

RESTRAINT SYSTEM

BACKGROUND

Vehicles may be subjected to impact testing. As one example, Federal Motor Vehicle Safety Standard (FMVSS) 208 provides a test procedure designed to simulate a frontal collision into, e.g., a wall. The test procedure provides that a test vehicle holding a test dummy as an occupant collides in a forward direction at 35 miles per hour into a stationary rigid barrier perpendicular to the path of the test vehicle. FMVSS 208 sets forth requirements for various measures of injury to the test dummy, simulating potential injury to an occupant of the vehicle, such as head injury criterion (HIC), chest deflection, femur load, etc.

DETAILED DESCRIPTION

Figure 1:
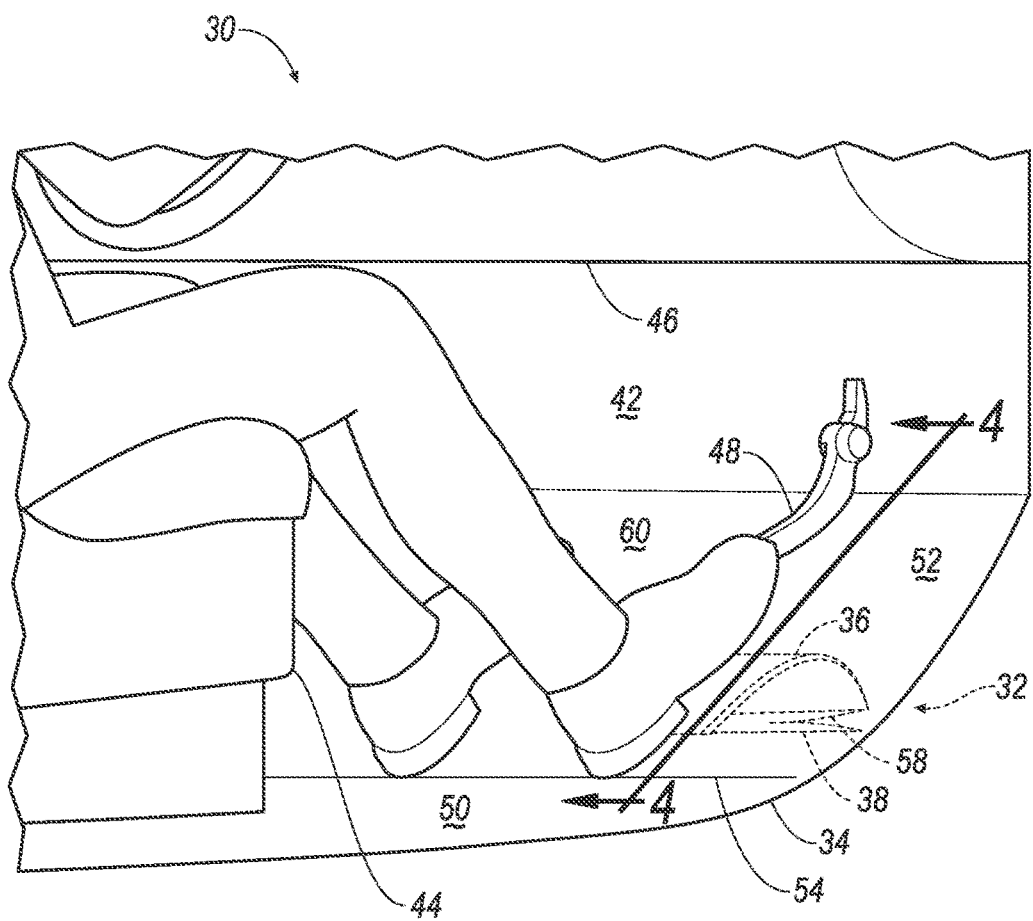
FIG. 1 is a perspective view of a footwell of a vehicle having a restraint system.

With reference to the Figures, wherein like numerals indicate like parts throughout the several views, a restraint system 32 for a vehicle 30 includes a floor 34, a platform 36, a hinge 40, and a deployable device 38. The hinge 40 couples the platform 36 to the floor 34. The deployable device 38 is inflatable from an uninflated position to an inflated position. The platform 36 is stiffer than the deployable device 38.

The restraint system 32 may reduce a moment experienced by an ankle of an occupant of the vehicle 30 during an impact. Without the restraint system 32, the ankle of the occupant may roll or twist about a pedal 48 of the vehicle 30. The restraint system 32 may provide support to reduce the moment of the ankle, which may reduce injuries to the occupant during an impact.

With reference to FIG. 1, the vehicle 30 may include a footwell 42. The footwell 42 provides a space for legs and feet of occupants of front seats 44 of the vehicle 30. The footwell 42 may be disposed in a vehicle-forward direction from the front seats 44 and in a vehicle-downward direction from an instrument panel 46, i.e., below the instrument panel 46. The pedals 48 are disposed in the footwell 42 for the occupant to use for controlling the vehicle 30.

The footwell 42 may include the floor 34. The floor 34 may support feet of occupants of the vehicle 30. The floor 34 may have a floor-pan portion 50 and a toe-pan portion 52. A corner 54 may connect the floor-pan portion 50 and the toe-pan portion 52. The floor-pan portion 50 may extend horizontally in a vehicle-forward direction. The toe-pan portion 52 may extend obliquely from the floor-pan portion 50 at the corner 54, e.g., in a vehicle-forward and vehicle-upward direction from the corner 54.

Figure 4:
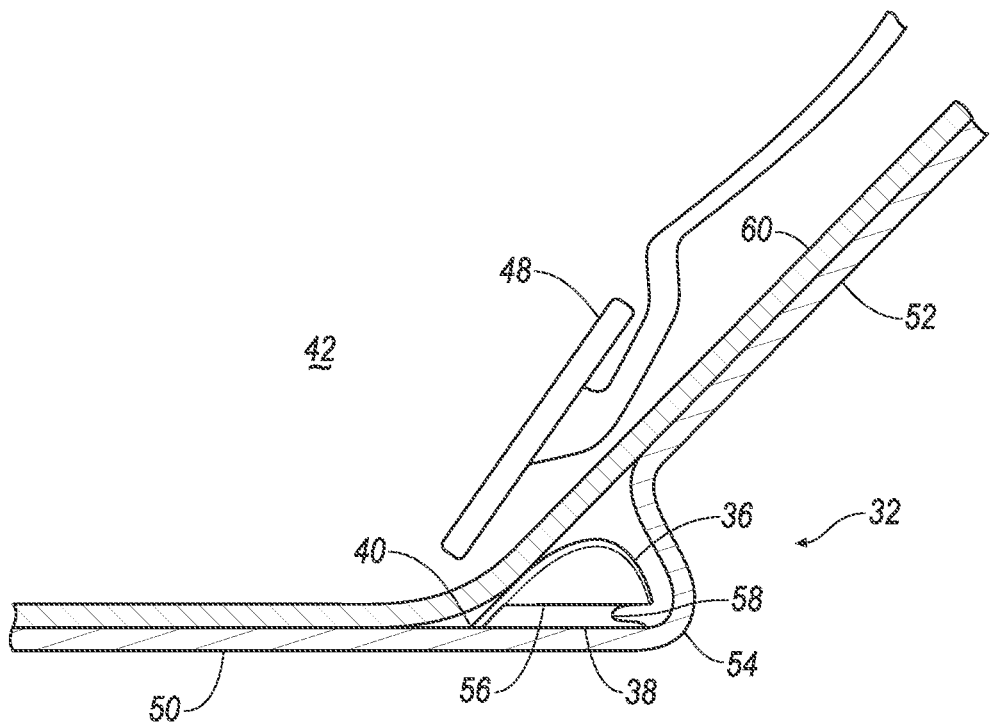
FIG. 4 is a cross-sectional view along line 4-4 in FIG. 1 with the deployable device in the uninflated position.
Figure 5:
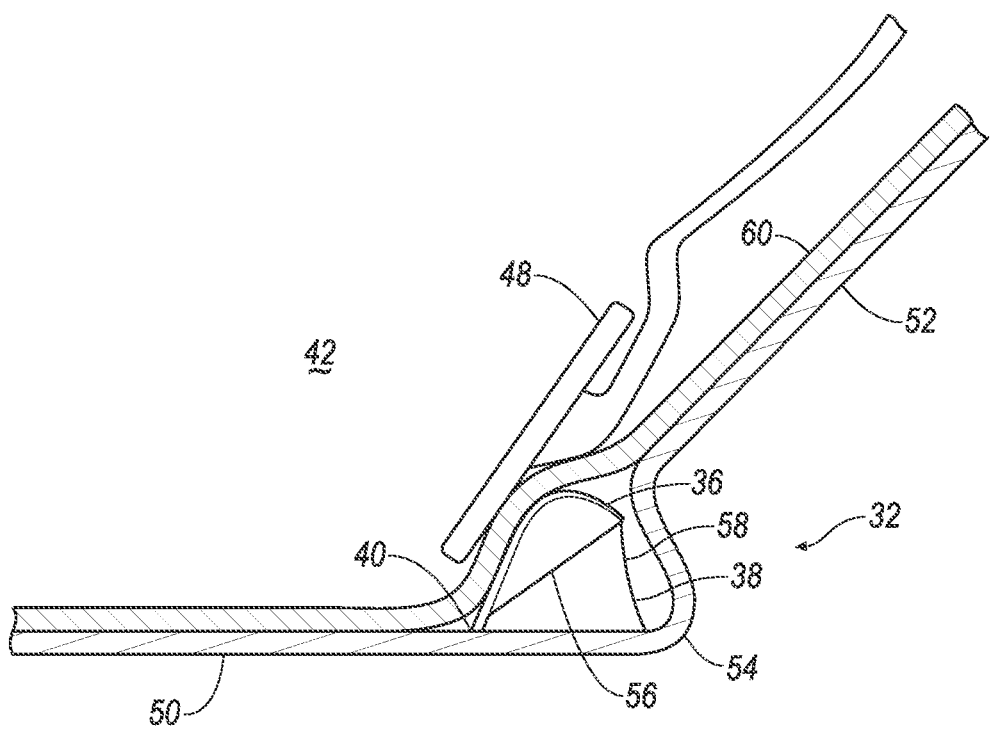
FIG. 5 is a cross-sectional view along line 4-4 in FIG. 1 with the deployable device in the inflated position.

With reference to FIGS. 4 and 5, the deployable device 38 may be coupled to the floor 34 between the platform 36 and the floor 34. More specifically, the deployable device 38 may be bonded to the floor 34. For example, the deployable device 38 may be welded, e.g., ultrasonically welded, to the floor 34. For another example, the deployable device 38 may be adhered to the floor 34 with structural adhesive, e.g., epoxy adhesive, acrylic adhesive, etc. For yet another example, the deployable device 38 may be mechanically fastened to the floor 34 by, e.g., clips, push pins, threaded fasteners, etc. The deployable device 38 may be adjacent a concave side 56 of the platform 36. The deployable device 38 may be disconnected from the platform 36; i.e., the deployable device may be separate and not directly connected, e.g., not adhered to, the platform 36.

Figure 2:
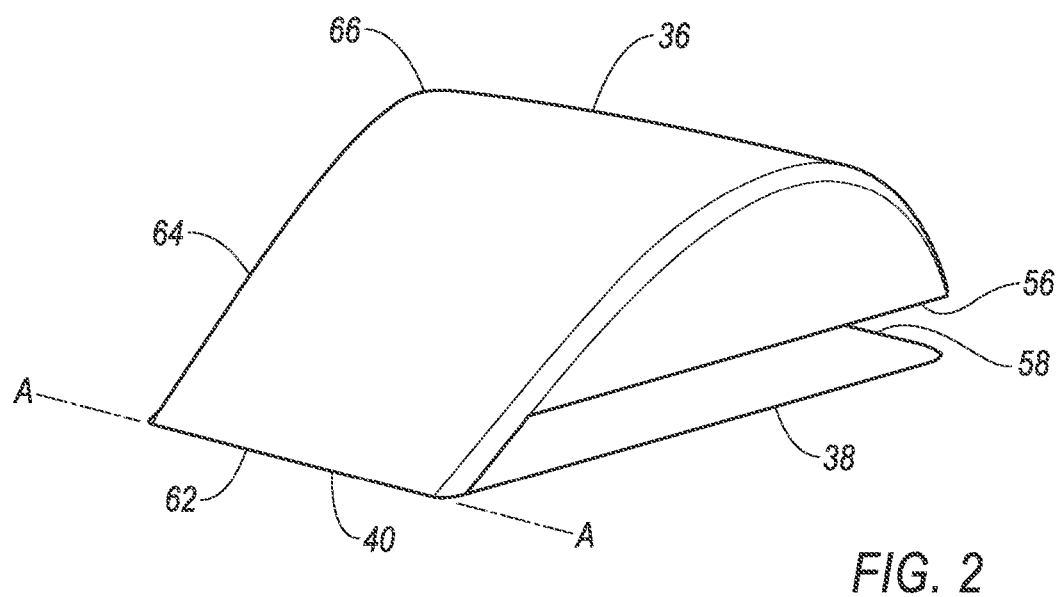
FIG. 2 is a perspective view of a platform and deployable device of the restraint system with the deployable device in an uninflated position.
Figure 3:
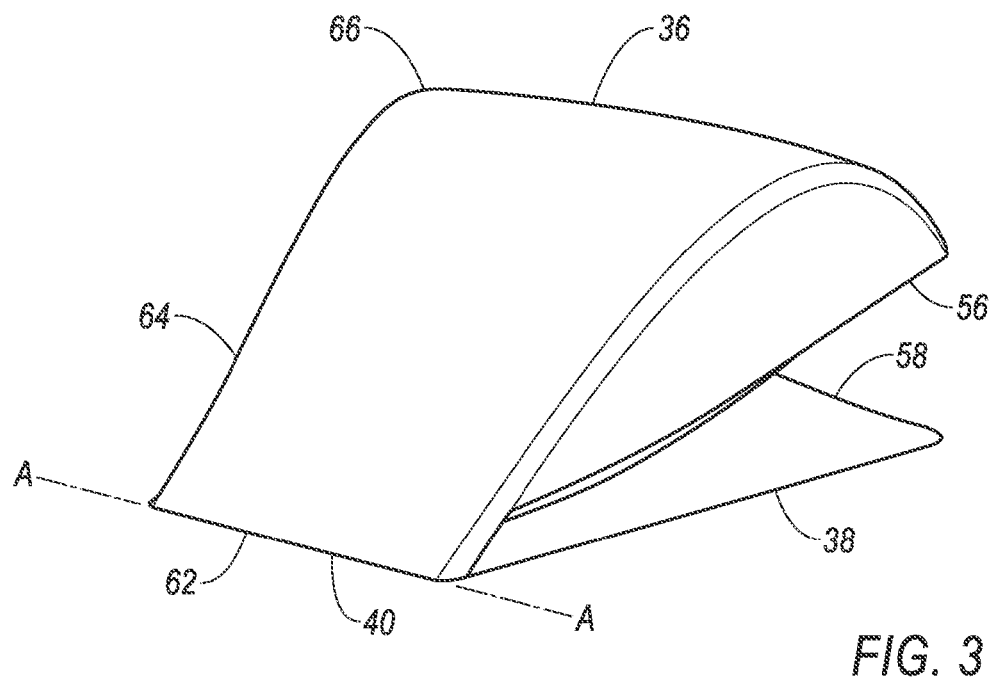
FIG. 3 is a perspective view of the platform and deployable device of the restraint system with the deployable device in an inflated position.

The deployable device 38 may be inflatable from the uninflated position, as shown in FIGS. 2 and 4, to the inflated position, as shown in FIGS. 3 and 5. In the uninflated position, the deployable device 38 may have one or more pleats or folds 58. In the inflated position, the deployable device 38 may be filled with inflation medium, straightening the folds 58. In the inflated position, the deployable device 38 may abut the platform 36.

The deployable device 38 may be formed of plastic. For example, the deployable device 38 may be formed of thermoplastic elastomer (TPE). A thermoplastic elastomer has both thermoplastic and elastomeric properties. A thermoplastic material becomes pliable above a particular temperature and solidifies upon cooling, and an elastomer generally has a low Young's modulus and a high failure strain. Types of TPEs include styrenic block copolymers, thermoplastic olefins, elastomeric alloys, thermoplastic polyurethanes, thermoplastic copolyesters, and thermoplastic polyamides. The material forming the deployable device 38 may be solid, in other words, not a woven fabric.

With continued reference to FIGS. 4 and 5, the platform 36 may be positioned above the deployable device 38 relative to the floor 34. The platform 36 may be positioned below a floor covering 60, that is, between the floor covering 60 and the floor 34. The platform 36 may be positioned on the floor 34 so as to abut the pedal 48 when the deployable device 38 is in the inflated position, i.e., directly touching or through an intermediate component. When the deployable device 38 is in the inflated position, the platform 36 may abut the pedal 48 through, e.g., the floor covering 60.

The platform 36 may be stiffer that the deployable device 38; that is, the platform 36 deforms less under a given load than the deployable device 38. The size, shape, and/or material type of the platform 36 and the deployable device 38 may make the platform 36 stiffer than the deployable device 38.

The platform 36 may be formed of plastic. The material forming the platform 36 may be stiffer than the material forming the deployable device 38. Stiffness for a material is an ability to resist elastic deformation, that is, deformation in a linear range of a stress-strain diagram. The material forming the platform 36 may be stiffer than a material forming the floor covering 60.

With reference to FIGS. 2-5, the hinge 40 may couple the platform 36 to the floor 34. The hinge 40 may be coupled to the platform 36 and to, e.g., the corner 54 or the toe-pan portion 52 of the floor 34. The hinge 40 may define an axis A. The hinge 40 may allow rotational motion, that is, the platform 36 may rotate relative to the floor 34 about the axis A. The hinge 40 may be coupled to the platform 36 at a first end 62, which may be a vehicle-rearward end of the platform 36.

With continued reference to FIGS. 2-5, the platform 36 may have a straight end portion 64 extending from the first end 62 and a curved end portion 66 opposite the first end 62. The curved end portion 66 may be located at a vehicle-forward end of the platform 36, opposite the hinge 40 along the platform 36. The straight end portion 64 may be located at a vehicle-rearward end of the platform 36, adjacent the hinge 40. The curved end portion 66 may be curved in a direction transverse to the axis A, such as the vehicle-forward direction, and the curved end portion 66 may be straight in a direction parallel to the axis A. The concave side 56 may face a vehicle-downward direction. The platform 36 may be wider along the axis A than the pedal 48.

With reference to FIGS. 4 and 5, the floor covering 60 may be positioned above the platform 36, on an opposite side of the platform 36 from the floor 34. The platform 36 is between the floor 34 and the floor covering 60. The floor covering 60 may be, for example, carpeting or any other material suitable for treading on by the feet of the occupants. The platform 36 may be stiffer than the floor covering 60. The material forming the platform 36 may be stiffer than the material forming the floor covering 60.

With reference to FIGS. 1, 4, and 5, the pedals 48 may be coupled to the floor 34 and disposed above the floor covering 60. The pedals 48 may be disposed on an opposite side of the platform 36 from the floor 34. The platform 36 may be between the floor 34 and the pedals 48. The pedals 48 may be coupled to the floor 34 directly or indirectly, for example, via other components allowing movement of the pedals 48 by the occupants relative to the floor 34. The pedals 48 may allow the occupant to control propulsion and/or braking of the vehicle 30. The pedals 48 may include an accelerator pedal, a brake pedal, a clutch pedal, etc.

Figure 6:
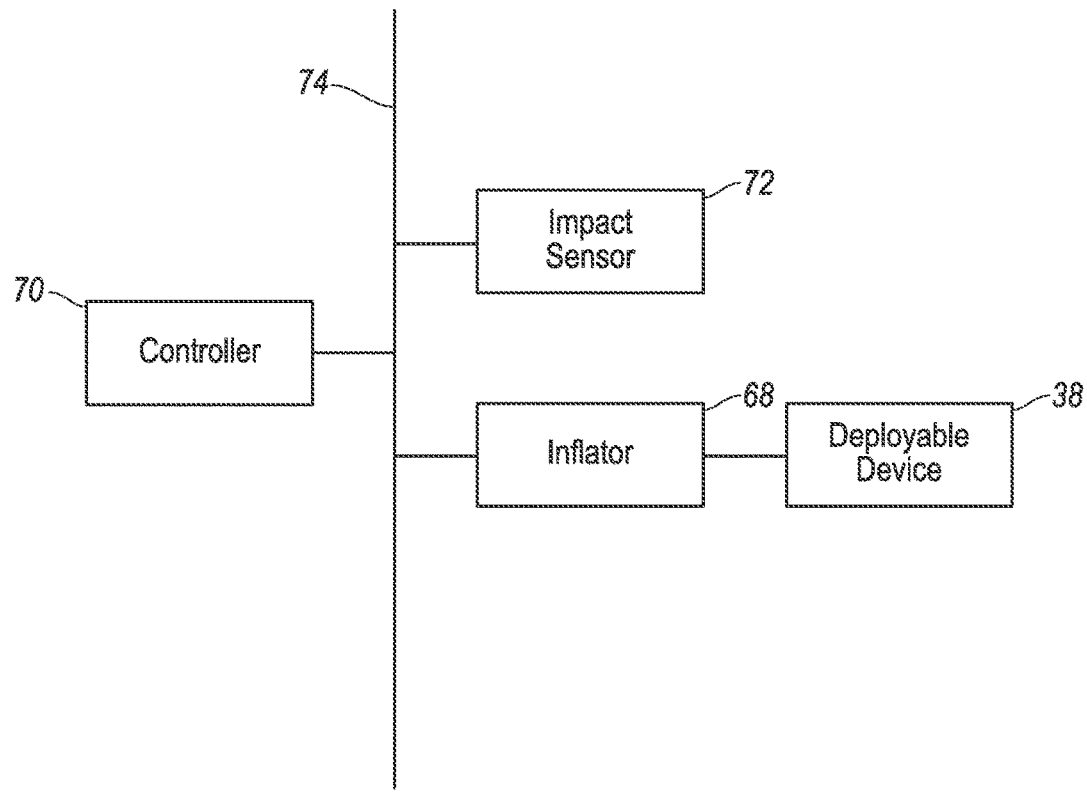
FIG. 6 is a block diagram of a control system for the restraint system.

With reference to FIG. 6, an inflator 68 may be in fluid communication with the deployable device 38. Upon receiving a signal from, e.g., a controller 70, the inflator 68 may inflate the airbag with an inflation medium, such as a gas. The inflator 68 may be, for example, a pyrotechnic inflator that uses a chemical reaction to drive inflation medium to the airbag. The inflator 68 may be of any suitable type, for example, a cold-gas inflator.

An impact sensor 72 may be in communication with the controller 70. The impact sensor 72 is adapted to detect an impact to the vehicle 30. The impact sensor 72 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 72 may be located at numerous points in or on the vehicle 30.

The controller 70 may be a microprocessor-based controller. The controller 70 may include a processor, memory, etc. The memory of the controller 70 may include memory for storing instructions executable by the processor as well as for electronically storing data and/or databases. The controller 70 may be programmed to instruct the inflator 68 to inflate in response to a frontal collision.

The controller 70 may transmit signals through a communications network 74 such as a controller area network (CAN) bus, Ethernet, Local Interconnect Network (LIN), and/or by any other wired or wireless communications network. The controller 70 may be in communication with the inflator 68 and the impact sensor 72 via the communications network 74.

In the event of an impact, the impact sensor 72 may detect the impact and transmit a signal through the communications network 74 to the controller 70. If the impact is a frontal impact, the controller 70 may transmit a signal through the communications network 74 to the inflator 68. The inflator 68 may discharge and inflate the deployable device 38. The deployable device 38 pushes the platform 36 upward so that the platform 36 is abutting the pedal 48. The platform 36 may also push the floor covering 60 upward while abutting the pedal 48. An occupant of the vehicle 30 may have a foot positioned above the pedal 48. The foot has forward momentum during the impact that causes the foot to travel into the pedal 48. If the foot is off center on the pedal 48, the platform 36 may prevent the foot from rolling on an edge of the pedal 48 by providing support for the foot outside a width of the pedal 48. The platform 36 may also prevent rolling of the foot by preventing the foot from moving toward the floor 34 with momentum. The support to prevent rolling may reduce a moment of the ankle and thus may reduce injuries to the foot or ankle of the occupant during the impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
    a floor having a floor-pan portion and a toe-pan portion at oblique angle from the floor-pan portion;
    a floor covering extending over the floor;
    a platform;
    a hinge coupling the platform to the floor and defining an axis of rotation of the platform about the floor; and
    a deployable device coupled to the floor between the platform and the floor;
    wherein the deployable device is inflatable from an uninflated position to an inflated position;
    the floor covering includes a bend defined by the oblique angle between the toe-pan portion and the floor-pan portion when the deployable device is in the uninflated position;
    the hinge is located beneath the bend; and
    the platform is stiffer than the deployable device.

2. The restraint system of claim 1, further comprising a pedal coupled to the floor and disposed on an opposite side of the platform from the floor.

3. The restraint system of claim 2, wherein the platform is positioned on the floor to abut the pedal when the deployable device is in the inflated position.

4. The restraint system of claim 2, wherein the hinge defines an axis, and the platform is wider along the axis than the pedal.

5. The restraint system of claim 1, wherein the deployable device is disconnected from the platform and in the inflated position abuts the platform.

6. The restraint system of claim 1, wherein a material forming the platform is stiffer than a material forming the deployable device.

7. The restraint system of claim 1, further comprising a floor covering, the platform being between the floor and the floor covering.

8. The restraint system of claim 7, wherein the platform is stiffer than the floor covering.

9. The restraint system of claim 8, wherein a material forming the platform is stiffer than a material forming the floor covering.

10. The restraint system of claim 1, wherein the platform has a curved end portion opposite the hinge.

11. The restraint system of claim 1, wherein the floor has a floor-pan portion and a toe-pan portion extending obliquely from the floor-pan portion.

12. The restraint system of claim 11, wherein the hinge is coupled to the toe-pan portion.

13. The restraint system of claim 11, further comprising a corner connecting the floor-pan portion and the toe-pan portion, wherein the hinge is coupled to the corner.

14. The restraint system of claim 1, further comprising an inflator in fluid communication with the deployable device.

15. The restraint system of claim 14, further comprising a controller in communication with the inflator, the controller programmed to instruct the inflator to inflate in response to a frontal collision.

16. A restraint system comprising:
   a platform having a first end, a curved end portion opposite the first end, and a concave side of the curved end portion;
   a hinge coupled to the first end; and
   a deployable device adjacent the concave side of the platform and inflatable from an uninflated position to an inflated position;
   wherein the platform is stiffer than the deployable device.

17. The restraint system of claim 16, wherein the curved end portion is curved in a direction transverse to an axis defined by the hinge, and the curved end portion is straight in a direction parallel to the axis defined by the hinge.

18. The restraint system of claim 16, wherein the deployable device is disconnected from the platform and in the inflated position abuts the platform.

19. The restraint system of claim 16, wherein the deployable device is formed of plastic.

20. The restraint system of claim 16, wherein a material forming the platform is stiffer than a material forming the deployable device.

* * * * *